Aug. 23, 1938.  C. FISCHER  2,128,085
HINGE
Original Filed Feb. 25, 1937
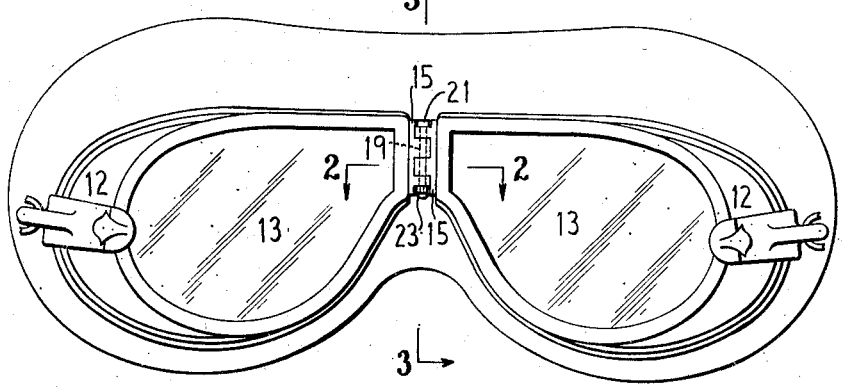
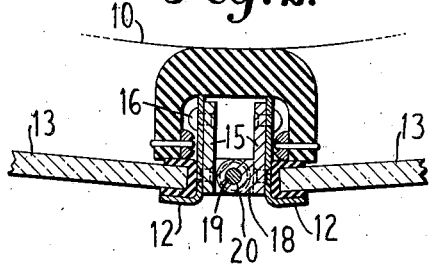
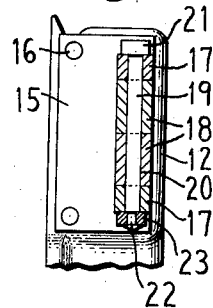
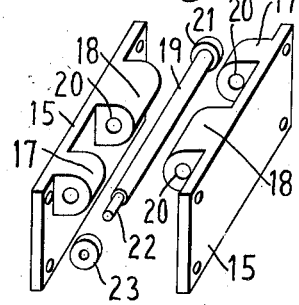
INVENTOR
*Charles Fischer*
BY *Geo. A. Senior*
ATTORNEY Patented Aug. 23, 1938

2,128,085

UNITED STATES PATENT OFFICE 2,128,085

HINGE

Charles Fischer, New York, N. Y.

Continuation of application Serial No. 127,594, February 25, 1937. This application January 19, 1938, Serial No. 185,636

2 Claims. (Cl. 2—14)

The invention relates to improvements in goggles and more particularly that type of goggles adapted for use by aviators, drivers of racing automobiles, motor boats or any other apparatus where a high rate of speed is maintained.

It is an object of the present invention to produce an improved combination of hinge construction and goggle assembly which affords substantial savings in manufacturing costs and assembly time and which allows freedom of movement between the goggle frames to insure a good fit as well as comfort to the wearer.

One of the objects of the invention is to provide a simple hinge which is neat in appearance, efficient in operation and one in which desirable savings in manufacturing costs and assembly time are effected.

Another object is to provide a goggle combination which permits of ample freedom of movement between the goggle frames for adaptation to different facial contours and brings the frames as close together as possible so as to eliminate blind spots in the vision.

A further object of the invention is to so position the hinge in relation to the goggle frames that a minimum amount of variation occurs when the frames are disposed in different angular relation to each other to accommodate varying facial contours.

A further object is to provide a goggle combination in which the hinge which is not only inherently strong but acts to strengthen and reinforce the goggle frames at their narrowest or weakest portions.

In addition to the foregoing other advantages will appear as this specification proceeds. Referring to the drawing forming a part thereof and in which a preferred embodiment of the invention is illustrated:

Fig. 1 is a front elevation of a goggle showing the improved hinge;

Fig. 2 is an enlarged detail sectional view taken on line 2—2 of Fig. 1;

Fig. 3 is a fragmentary detail sectional view taken on line 3—3 of Fig. 1; and

Fig. 4 is a perspective view of the hinge parts showing them separated.

The present application is a continuation of application, Serial No. 127,594, filed February 25, 1937.

The goggle includes a pad 10 composed of soft rubber, provided with eye openings, and adapted to efficiently and comfortably conform to the face of the wearer. Surrounding the eye openings and secured to the pad are light metal frames 12 which carry the lens members 13. The said frames are so designed or shaped as to form a planar surfaced end portion, also referred to as the bridge portion of the frame, to which plates 15, carrying the hinge means, are attached.

The hinge connection comprises a pair of plates 15 which are riveted or otherwise secured at 16 to what is termed the narrow parts of the frames. It will be noted, see Fig. 3, the plate 15 substantially covers the end area of the bridge portion 10 and therefore acts to strengthen and give additional rigidity to this portion of the goggle frame.

Each plate is formed with knuckles 17, 18 spaced apart on the plates. As illustrated, the plates with the knuckles thereon are identically formed and either plate may be used with either frame.

When assembling, it is only necessary to invert one plate with respect to the other, so that the inner end face of the short knuckle 17 of each plate abuts against the outer end face of the long knuckle 18 of the other plate, with the knuckle openings in registering relation.

It will also be noted the long knuckles 18 are adjacent each other at the intermediate portion of the hinge. This arrangement greatly strengthens the hinge, particularly against strains set up when there is a tendency to laterally displace the frames in relation to each other.

It is also considered important to have the knuckles positioned on the extreme outer edges of the plates. With this construction the hinge joint is as far forward as possible and the result is a minimum amount of variation occurs when the frames are disposed in different angular relations to each other to accommodate varying facial contours, thus making for better vision. This positioning of the hinge joint likewise affords a maximum freedom for flexing of that portion of the integral soft rubber pad 10 which extends below the bridge portion of the frame.

Another important feature is the compactness of the hinge. The knuckles extend from the plates only a distance substantially equal to their width. The goggle frames with their lenses are thus brought as close together as possible and blind spots are eliminated in the vision.

After the knuckles have been brought in registering relation a hinge pin 19 is passed through the openings 20 in the knuckles. The hinge pin is provided with a head 21 at one end and the opposite end 22 is turned down to a smaller diameter. This end passes through a collar 23 and is peened over to complete the assembly of the hinge. The short knuckles 17 terminate short of either end of the plates and adequate space is thus provided for the head 21 and collar 23 of the hinge pintle. Thus the hinge presents a very neat and symmetrical appearance and the head and collar do not project beyond the goggle frames.

I claim:

1. In a goggle structure, the combination comprising a pair of metal frames adapted to retain lenses and shaped to afford bridge portions, a hinge means attached to the said frames at the ends of their respective bridge portions, the said hinge means including a pair of plates substantially the width and depth of the bridge portions, a long and short knuckle on each plate, the knuckles of one plate being identical with and spaced apart the same distance as the knuckles of the other plate, the long knuckles being adjacent to each other at the intermediate portion of the said hinge plates, thereby strengthening the hinge, the said knuckles being positioned along the longitudinal extreme outer edges of the said plates, each of the said plates being aligned with and attached to a respective bridge portion end of the frame so that the outer edge of the plate extends parallel to the outer edge of the respective bridge portion, and a hinge pintle adapted to be passed through and secured in registering openings in the knuckles.

2. In a goggle structure, the combination comprising a unitary soft rubber pad provided with eye openings and adapted to efficiently and comfortably conform to the face of the wearer, metal frames adapted to retain lenses surrounding the said eye openings and being secured to the pad, the said frames being shaped to afford bridge portions, hinge means attached to said frames at their respective bridge portions, the said hinge means including a pair of plates substantially the width and depth of the bridge portions, a long and short knuckle on each plate, the knuckle of one plate being identical with and spaced apart the same distance as the knuckles of the other plate, the long knuckles being adjacent to each other at the intermediate portion of the said hinge plates, thereby strengthening the hinge, the said knuckles being positioned along the longitudinal extreme outer edges of the said plates, each of the said plates being aligned with and attached to a respective bridge portion, and a hinge pintle adapted to be passed through and secured in registering openings in the knuckles.

CHARLES FISCHER.